J. C. POTTER & J. JOHNSTON.
TURRET LATHE.
APPLICATION FILED MAR. 27, 1905.
1,074,561.
Patented Sept. 30, 1913.
5 SHEETS—SHEET 3.
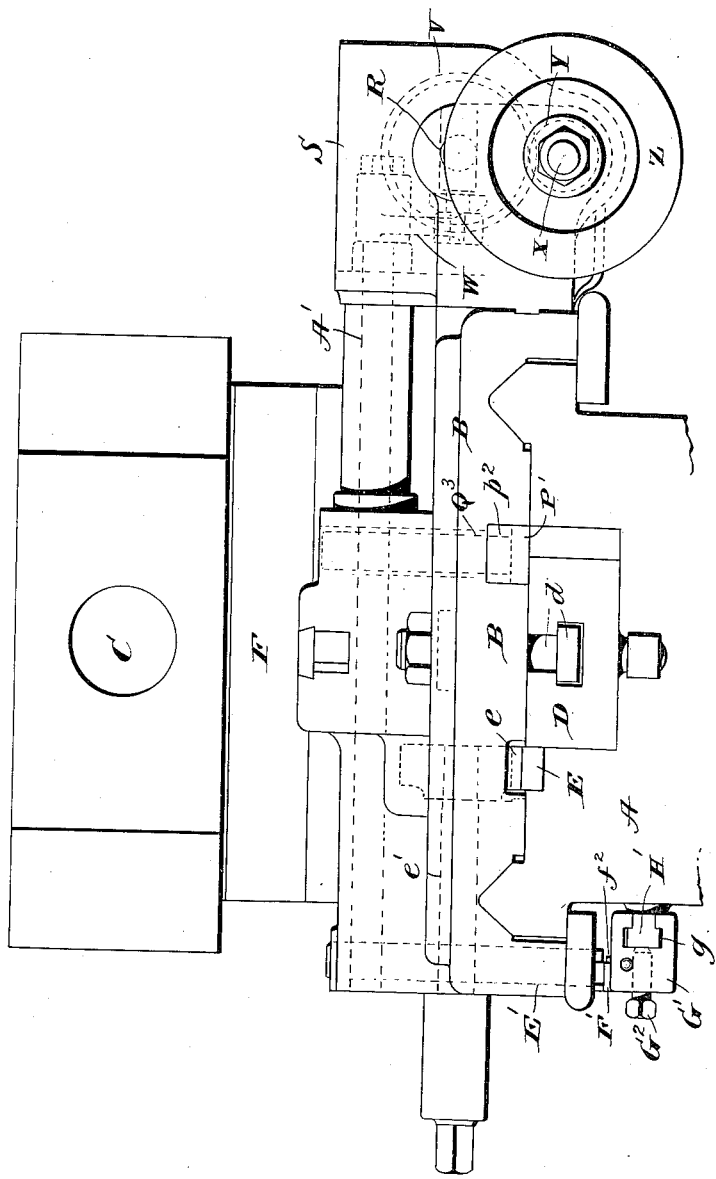
Witnesses
Jas. E. Hutchinson
J. L. Lawlor
Inventors
Jas. C. Potter & John Johnston,
by Prindle and Williamson, Attorneys

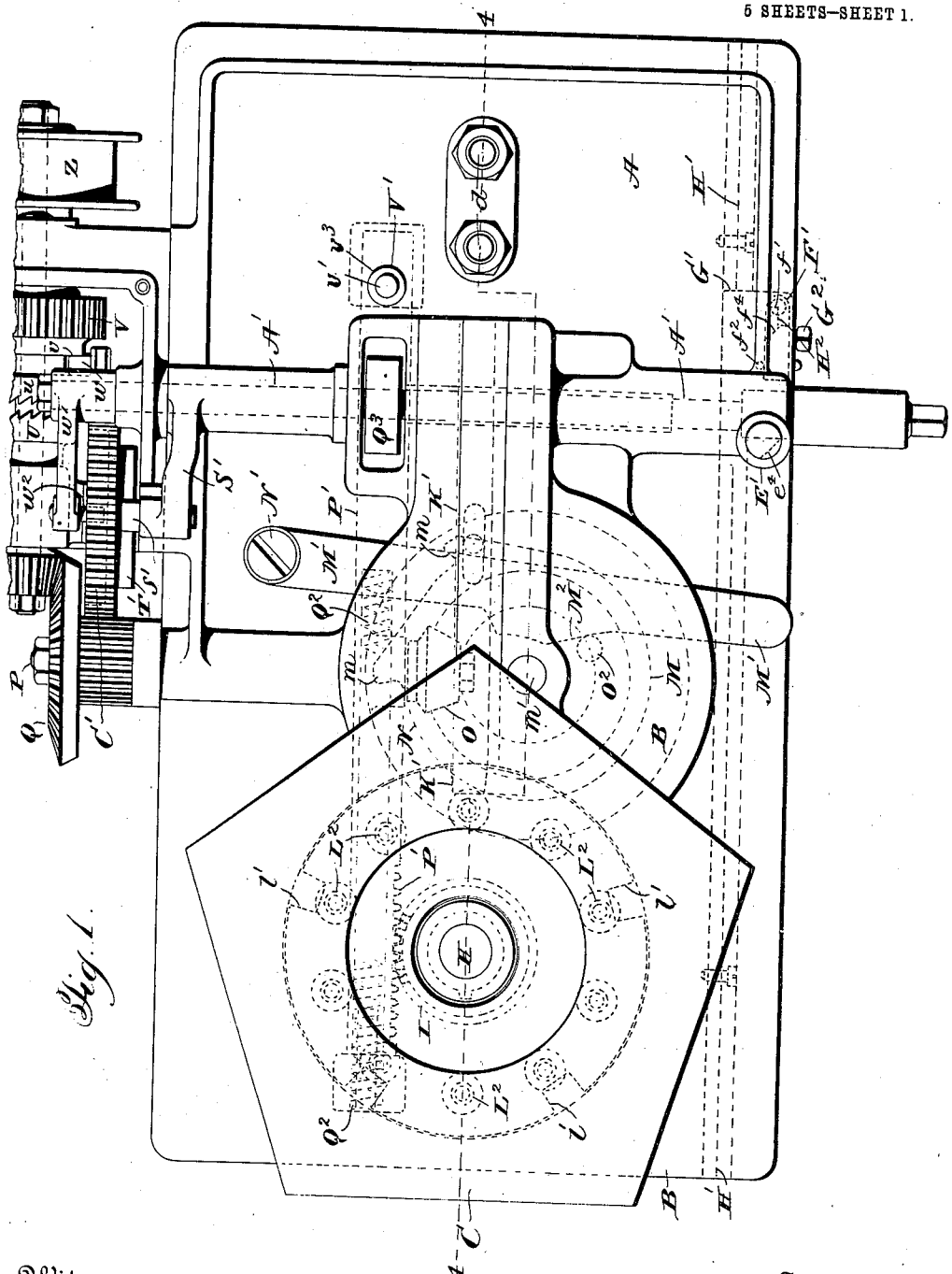

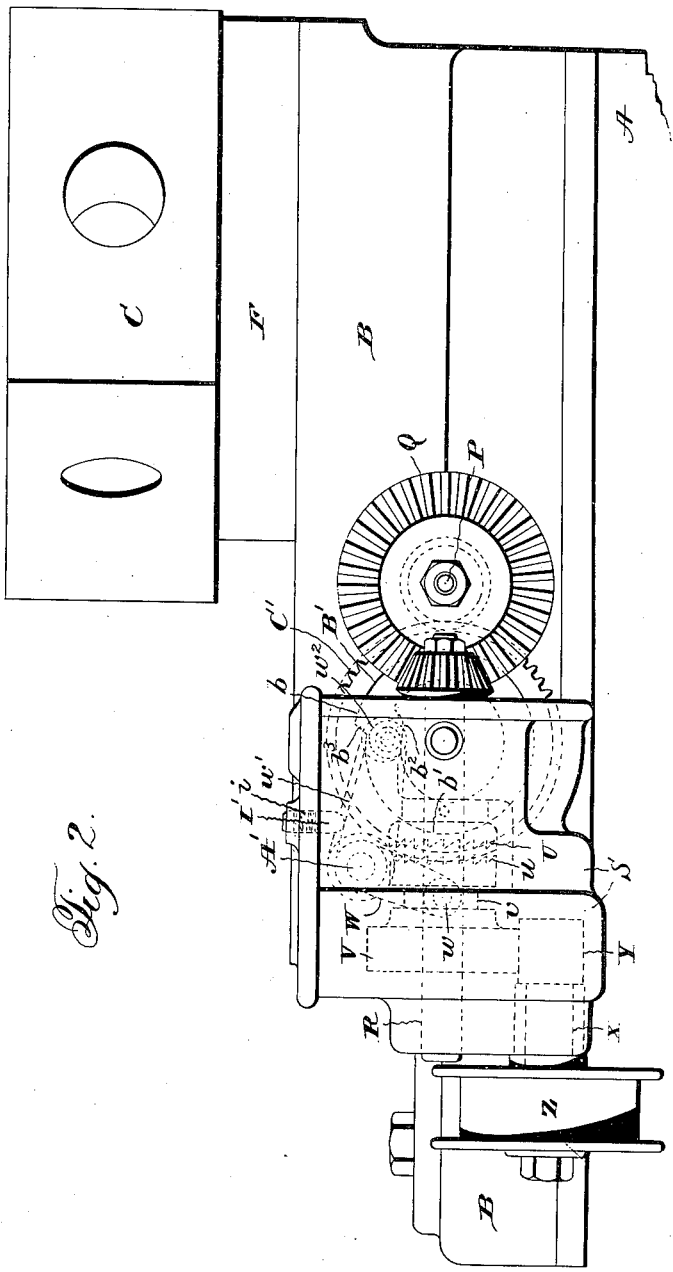

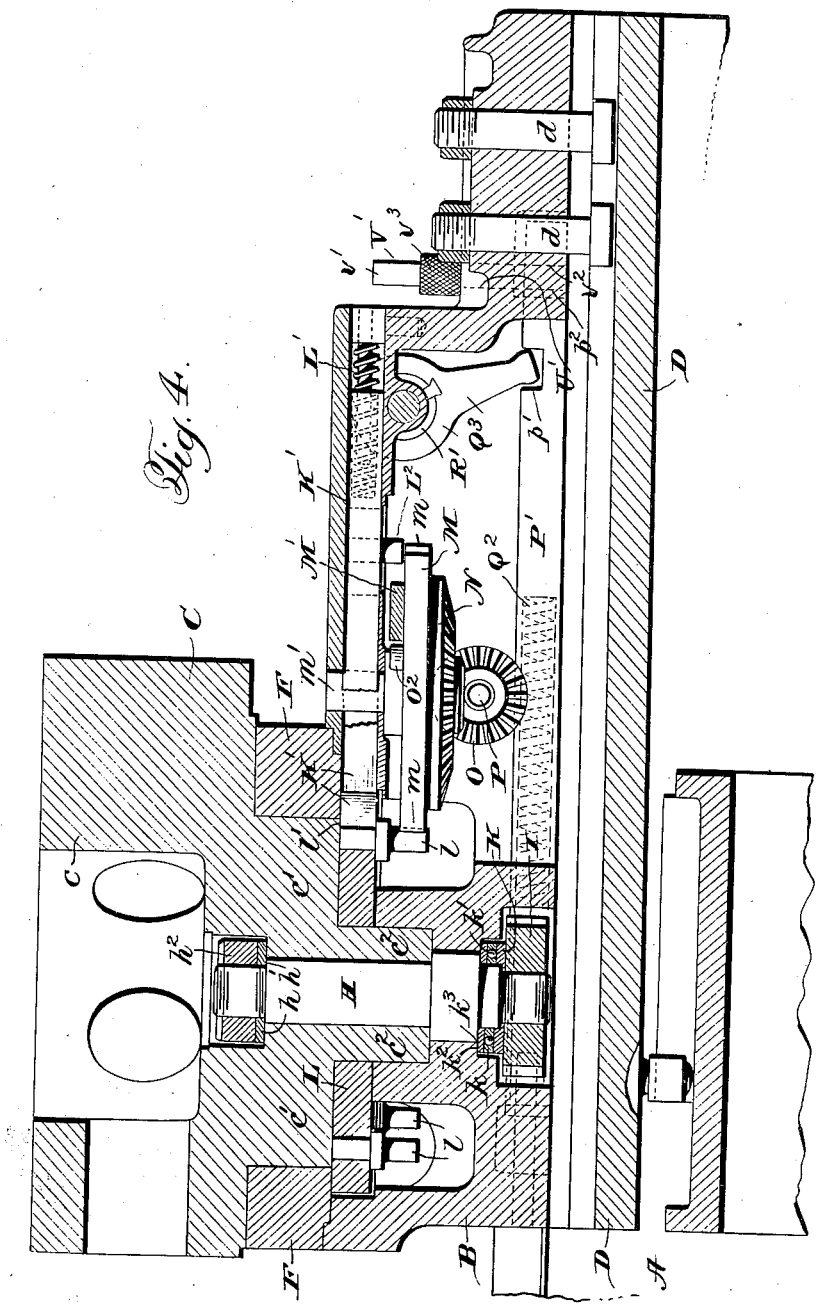

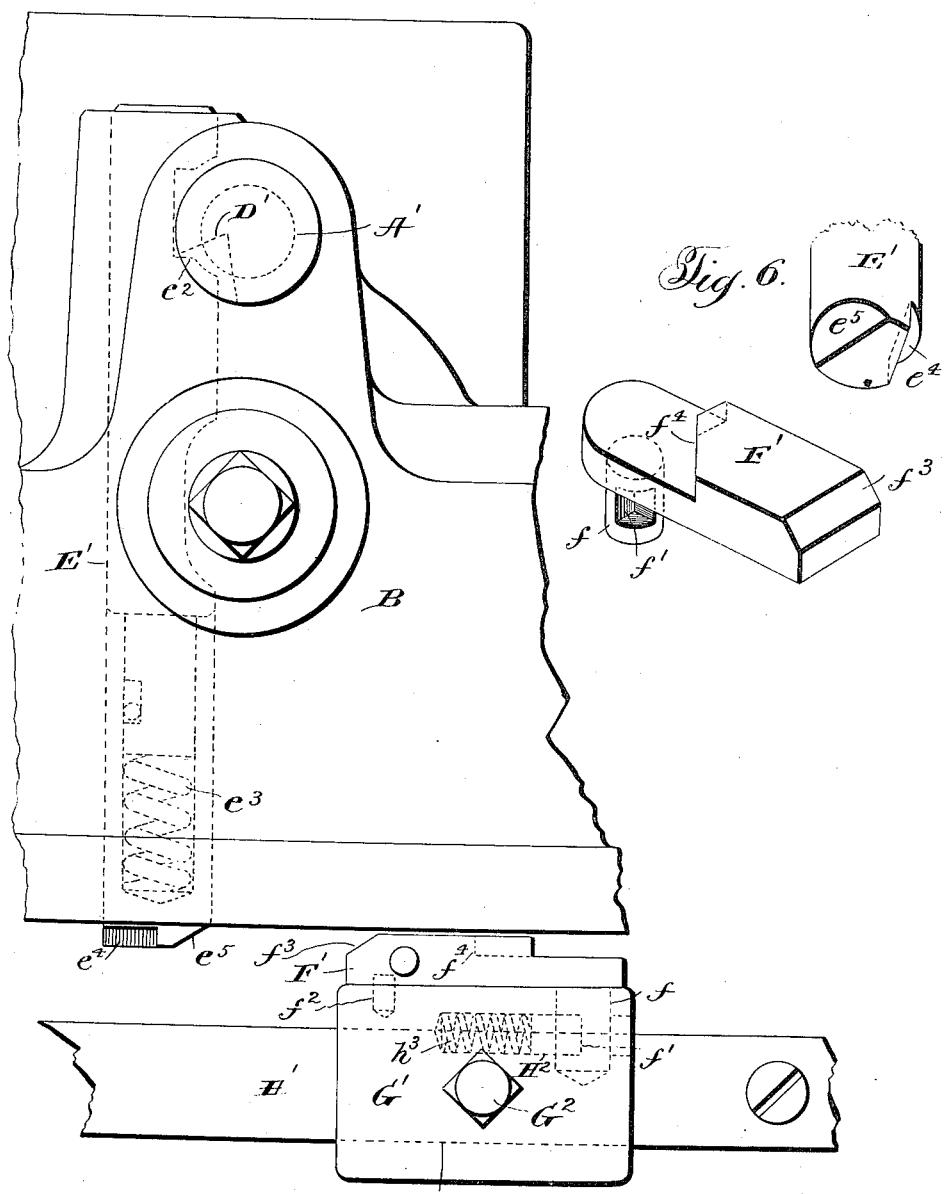

UNITED STATES PATENT OFFICE.

JAMES C. POTTER AND JOHN JOHNSTON, OF PAWTUCKET, RHODE ISLAND, ASSIGNORS TO POTTER AND JOHNSTON MACHINE COMPANY, OF PAWTUCKET, RHODE ISLAND, A CORPORATION OF RHODE ISLAND.

TURRET-LATHE.

1,074,561.  Specification of Letters Patent.  Patented Sept. 30, 1913.

Application filed March 27, 1905. Serial No. 252,344.

*To all whom it may concern:*

Be it known that we, JAMES C. POTTER and JOHN JOHNSTON, of Pawtucket, in the county of Providence, and in the State of Rhode Island, have invented a certain new and useful Improvement in Turret-Lathes, and do hereby declare that the following is a full, clear, and exact description thereof, reference being had to the accompanying drawings, in which—

Figure 1 is a top plan view of a lathe embodying our invention; Fig. 2 is a rear elevation of the lathe illustrated in Fig. 1; Fig. 3 is an end elevation, of such lathe; Fig. 4 is a vertical, longitudinal sectional view of the said lathe taken on the line 4—4 of Fig. 1; Fig. 5 is a side elevation of the portion of the lathe showing the tripping mechanism for the turret revolving mechanism. Fig. 6 shows details in perspective of parts illustrated in Fig. 5.

The object of our invention has been to provide a turret lathe which shall have among others the following advantages;— that of causing the turret to be clamped to its slide during the cutting by each tool, the turret being of course unclamped to permit its revolution; that of having mechanism for revolving the turret, which mechanism shall be capable of operation at the highest practicable speed and that shall be independent of the speed of travel of the turret slide, so that the maximum practical speed of revolution of the turret can be maintained, whether the speed of travel of the turret slide be high or low; of having mechanism by which the turret can be revolved any desired number of stations between any two successive reciprocations of the turret slide; that of having means by which the turret can be adjusted toward or from the work without moving the turret-reciprocating mechanism; that of having means by which the turret can be released from its turning mechanism, so that the turret can be revolved by hand without actuating the turret-reciprocating or turret turning mechanism; that of having the turret mounted upon a slide that rests directly upon the ways on the lathe-bed while also having provision for adjusting the field of operation of the turret toward or from the lathe head.

In carrying our invention into practice we provide a lathe bed A upon which is mounted a slide B, the slide resting directly on the ways of the lathe and carrying a turret C. Between the ways of the bed, a plate or bar D is reciprocated by any desired mechanism, preferably by means of a drum having cams secured to its periphery, such cams acting on a pin or roll secured to the bar D, whereby the bar is reciprocated at the speed and length of stroke which it is desired to give the turret. The turret slide B is secured to the bar D as by T-head bolts $d$ passing through holes in the slide and engaging a T-shape slot in the bar D, the slot extending parallel to the ways of the bed and serving to permit fastening the turret slide to such bar at any desired point, so that the field of operation of the tools can be located close to or farther away from the lathe head, and this without changing any of the cams on the drum which drives the bar D.

In order that the turret slide may be readily shifted along the bar D, we provide a rack E which is secured to or formed on the bar D, the rack being engaged by a pinion $e$ on a shaft $e'$ that is journaled in the turret slide, the said shaft preferably having a squared end for engagement by a socketed crank.

The head $c$ of the turret C rests upon a ring F on the turret slide, and a neck $c'$ on the turret is journaled within such ring. A stem $c^2$ on the turret is journaled in the turret slide. A clamping bolt H is keyed in a hole in the bed and extends up through an axial hole in the turret stem. The upper end of the bolt carries a washer $h$ that is held against a shoulder $h'$ on the bolt by a nut $h^2$ that is locked on the bolt. On the lower end of the bolt H a nut I, in the form of a pinion, is threaded on the bolt; and such nut, on being screwed up, may be made to bear on a hardened washer K, the latter supporting a ring $k$ having bearing balls $k'$ therein, upon which balls rests another hardened ring $k^2$. The ring $k^2$ is directly beneath a surface $k^3$ on the turret slide, against which surface the said ring is adapted to be forced by screwing up the pinion nut. This action causes the bolt H, and with it the turret, to be drawn down, so that the turret can be securely clamped to its slide. As the pinion-nut is tightened, the lower, hardened washer K can turn with the nut, the balls permitting such action; and the friction of tightening the nut is thus made very small.

At the base of the turret stem is keyed a disk L, the said disk being provided with equally spaced pins $l$, there being twice as many pins as there are stations on the turret; and such disk is also provided with notches $l'$ for engagement with a locking bolt to be later described. The pins $l$ are adapted to be engaged by teeth $m$ on a disk M that is journaled on a stud $m'$ secured in the turret slide. The number of teeth $m$ is equal to the number of pins $l$ between two turret stations, in the instance chosen for illustration, there being two teeth. Thus, at every revolution of the disk M the turret will be revolved one station.

Upon the under side of the disk M, a beveled gear N is fastened, and such gear is engaged by a beveled pinion O that is secured on a horizontal shaft P journaled in the turret slide. The shaft P extends, preferably, beyond the ways of the bed, and upon its extended end is provided with a beveled gear Q. A shaft R is journaled in bearings formed by a box-like extension S that is formed on or secured to the side of the turret slide, such shaft being preferably parallel to the ways of the bed. The shaft R has a clutch-member U fixed thereon, and a clutch-member $u$ journaled thereon. The clutch-member $u$ is formed on or secured to a gear V, there being a neck $v$ between the gear and clutch member for engagement of a pin $w$ on a shipper lever W. A shaft X is journaled in the extension S parallel to the shaft R, and is provided with a pinion Y which meshes with the pinion V. The shaft Y is, also, provided with a belt pulley Z that is preferably belted to the shaft by which the lathe is driven. Any other means for driving the clutch-member $u$ at a uniform rate of rotation may be substituted for those which have been described. The lever W is mounted on a shaft A' which is journaled transverse to the ways in the turret slide, and such lever is provided with an arm $w'$ that carries an antifriction roller $w^2$, which latter engages a path cam B' in the side of a gear C', which latter meshes with a pinion on the shaft P. The proportion of the gearing is such that the gear C' revolves once for every station of the turret. The cam B' is circular from a point $b$ around to a point $b'$, the remainder of the cam approaching the center of the gear to a point $b^2$ where there is a sharp inclination outward to connect with the circular portion of the cam. The cam is so formed that when the roller $w^2$ is in the circular portion of the cam, the clutch-member $u$ will be held in engagement with the clutch-member U, and when the roller enters the inclined portion of the said cam, the lever will be swung to disengage the clutch members. When the clutch members are disengaged, the cam B' will stop with the roller $w^2$ in the portion $b^3$ of the cam which connects the circular portion with the inclined or spiral portion, and the clutch-members can, therefore, be reëngaged by swinging the lever W on its fulcrum. This is accomplished by turning the shaft A' in the following manner: The end of the said shaft, opposite to that on which the lever is secured, is provided with a shoulder D', formed as by cutting away a portion of the shaft, and the said shoulder is engaged by a shoulder $e^2$ formed on a rod, or bolt, E' mounted in a vertical hole in the turret slide. The bolt E' is depressed by a spring $e^3$, and on the rearward edge of its bottom is provided with a surface $e^5$ inclined to the horizontal, and forward of such surface is provided with a vertical surface $e^4$ inclined forward in a direction toward the ways. A spring latch F' is fixed on a pin $f$ that is pivoted in a block G' that is provided with a T-slot $g$, the latter receiving a T-shaped guide H' that is secured to the side of the turret slide. The block G' is provided with a set screw $G^2$ by which it can be secured in any desired position. The pin $f$ is cut away to form a shoulder $f'$ against which bears a block $H^2$ that is pressed toward the said shoulder by a spring $h^3$. The latch F' thus tends to turn inward against a pin $f^2$ secured upon the block G'. The latch F' is provided with an inclined surface $f^3$ at its forward end, which is adapted to ride under the inclined surface $e^5$ on the bolt E', and thus to raise the bolt. The said latch is, also, provided with a vertical inclined surface $f^4$ which is adapted to ride against the surface $e^4$ on the bolt E', and thus to cause the latch to swing outward without disturbing the said bolt when the turret slide is moving in a forward direction. When the latch rides under the bolt E' it raises the latter, oscillates the shaft A', swings the lever W to cause the clutch member $u$ to engage the clutch member U and at the same time to cause the roller $w^2$ to rise into the path of the circular portion of the cam B'. The clutch members, being engaged, cause the gear C' to revolve and thus cause the roller $w^2$ to fully enter the circular portion of the cam, which prevents the lever W from unshipping the clutch after the latch F' has passed from beneath the bolt E'. The clutch is thus maintained in engagement while the roller $w^2$ passes through the circular portion of the cam, and until the inclined portion of the cam permits the lever W to be swung. The said lever is given a tendency to swing in a direction to disengage the clutch by a spring bolt I' mounted in a cover of the box like projection S, the said bolt being depressed by a spring $i$. It is obvious that the latch F' can be made of sufficient length to keep the bolt E' elevated as long as desired, and thus to cause as many revolutions of the cam as may be wished for. The latch may, also, be provided with a series of elevations and depressions to cause the cam to revolve as many times as desired, and at any desired times during the movement of the turret slide.

The notches l' in the disk L are engaged by a locking bolt K' that is mounted to reciprocate in the turret slide. The said locking bolt is preferably located above the disk M, and is forced into locking position by a spring L'. The locking bolt is provided with a pin L² that is engaged by a hand lever M', the latter being pivoted, as by a screw N', upon the turret slide. The hand lever M' is provided with a cam M², by which the lever is operated by means of a pin O² on the disk M. As the disk revolves, the pin O² rides against the hand lever M', moving the latter to the right as seen in Fig. 1, and causing the latter to engage and move the pin L² and with it the locking bolt, the movement taking place against the stress of the spring L'. After the pin O² has passed the cam M², the spring returns the locking bolt and causes its beveled end to engage one of the notches l' in the disk L. This movement, of course, takes place after the rotation of the turret.

The pinion nut I for clamping the turret to the turret slide is operated by a rack bar P', the thread of the nut being such that the locking movement of the rack bar is to the right as seen in Fig. 1. Such movement of the rack bar is caused by a spring Q², which for compactness extends for a large portion of its length into a hole in the rack bar. When the pinion-nut I is to be unlocked, the rack bar is moved forward by a rock arm Q³ that engages a notch p' formed in the rack bar, the said rock arm being keyed to a sleeve R' that is mounted upon the shaft A'. The end of the sleeve R' opposite to that carrying the arm Q³ is provided with a rock arm S', carrying an antifriction roller s' that rests upon a cam T', the latter being secured to a side of the gear C' in which the cam B' is formed. In order to leave the turret unclamped so that it can be rotated by hand, as, for instance, in setting the tools, the turret slide is provided with a hole U' over the path of the rack bar, and the rack bar with a hole p² in position to stand under the hole U' when the rack bar is in unclamped position. A pin V' that is provided with longer and shorter cylindrical ends v' and v², united by a knurled portion v³, is placed with its longer portion extending through the hole U', when it is desired to lock the rack bar from clamping. When the rack bar is reciprocated rearward the pin V' drops into the hole in the rack bar and locks the bar back. When it is not desired to lock the rack bar, the pin is inverted, and its shorter cylindrical portion is put into the hole X, and thus the pin is conveniently held until it is desired to use it.

In the operation of the above described illustration of our invention, the rack bar P' is locked in unclamped position by means of the pin V'. The T-bolts d are loosened, if necessary, and the turret slide is shifted toward or from the work by means of a crank turning the shaft e', and causing the pinion e to travel along the rack E. The T-bolts are then clamped. This adjustment of the turret slide, it will be observed, is effected without necessity for turning the cam drum or other means by which the turret slide is reciprocated. The tools are then adjusted in the turret, the turret being unlocked when it is desired to revolve it by means of the hand lever M', the turret when unlocked being capable of revolution by hand. The lathe is then set in motion, and the pulley Z is continuously revolved at a uniform rate of speed. The block G' is adjusted to cause the bolt E to be raised on the rearward stroke of the turret slide, and when the said bolt rides up upon the latch F', the clutch is engaged as before described, causing the gear C' and pinion T to make one or more revolutions, according as the surface of the latch F' is short or long. The revolution of the gear C' causes the revolution of the cam T' which swings the sleeve R' and, through the rock arm Q³, causes the rack bar P' to move against the stress of the spring Q', and to rotate the pin nut I, thus unclamping the turret. The rotation of the pinion Q then causes the rotation of the disk M, which first, by means of the pin O², causes the locking bolt to be withdrawn, and then, by means of the teeth m, rotates the turret one station. The locking bolt then engages the turret, and the rack bar P' again locks it.

It will be seen that, in the above illustrated lathe, the turret is mounted upon a slide which is directly mounted upon the ways of the lathe. The turret is thus always provided with an ample base to support it and is never, at any moment, upon an overhanging part. The turret is not only thus well supported, but each time that a tool approaches the work, the turret is not only accurately revolved to and locked in place; but it is securely clamped to the turret slide. The tool is thus supported in the firmest manner, and is capable of doing the best and most accurate work. While the turret is thus securely clamped during the operations of the tools, it can, as before described, be caused to remain unclamped, so that it can be revolved by hand, if desired, for adjusting the tools. The mechanism for revolving the turret is driven independently of the movement of the turret slide so that the revolution of the turret can take place at the highest speed which is practicable without any reference to the speed travel of the turret slide. Much valuable time is thus saved. The turret-revolving mechanism possesses the further advantage that the turret can be revolved any desired number of stations between two reciprocations of the turret slide. This has the advantage of enabling a lesser number of tools to be used than the full number of stations in the turret without involving any useless reciprocations of the turret slide. The turret-slide reciprocating mechanism, it will be observed permits the adjustment of the turret so that its field of operations shall be near to or farther from the head stock of the lathe without any necessity for revolving the cam drum.

By describing in detail a particular construction or arrangement we do not intend to limit ourselves beyond the terms of our several claims, or requirements of the prior art. It is evident that many changes can be made in the above described construction which will be within the scope of our invention.

Having thus described our invention, what we claim is:—

1. In a turret lathe, the combination of a turret, a support therefor, means for revolving the turret, and means for clamping the turret, comprising a threaded stem on the turret projecting through the support, a pinion nut engaging the other side of the support from the turret, and a rack-bar engaging said pinion-nut, a spring for moving said rack-bar in a direction to clamp the nut, and a cam-operated lever for moving said rack-bar in the opposite direction.

2. In a turret lathe, the combination of a turret, a support, means for revolving said turret, and means for clamping said turret during cutting operations, said means for clamping comprising a stem on said turret passing through said support, a pinion nut on the opposite side of said support from said turret, a rack-bar engaging said pinion-nut, a spring for moving said rack-bar in a direction to clamp the turret, means for positively moving the rack-bar in the opposite direction, and a latch adapted to secure said rack-bar in unlocked position.

3. In a turret lathe, the combination of a turret, a support for the turret with which it is movable toward and from the work, means for moving said support, a turret clamp comprising independent members that are movable toward and from each other, and automatic means positively acting on the clamp to release the turret, operated independently of the turret-support moving means.

4. In a turret lathe, the combination of a turret, a support for the turret with which it is movable toward and from the work, means for moving said support, a turret clamp comprising a bolt having a turret engaging member and a turret support engaging member, and automatic means positively acting on the clamp to release the turret, operated independently of the turret-support moving means.

5. In a turret lathe, the combination of a turret, an automatic clamping device for the turret embracing a pinion, and a clamping member actuated by the rotation of the pinion, a rack bar, and a spring for moving the rack bar in one direction, and a latch consisting of a pin to engage a shoulder on the rack bar.

6. In a turret lathe, the combination of a turret, a support therefor, a turret clamping device embracing a pinion and a clamping member actuated by the rotation of the pinion, and a spring actuated rack bar, and an automatic latch to engage said rack bar when in turret unclamping position, consisting of a pin having a bearing in the turret, and consisting of a body portion provided with longer and shorter ends, the longer end being adapted to engage a shoulder on the rack bar.

7. In a turret lathe, the combination of a turret, a support therefor, means for rotating said turret, means for clamping said turret, said means for clamping comprising a stem on the turret and passing through said support, a pinion-nut on the opposite end of said stem from said turret, a rack-bar adapted to operate said pinion-nut, a spring for moving said rack-bar in clamping direction, a rock-arm adapted to move said rack-bar in unclamping direction, a second rock-arm connected to said first rock-arm, a pin on said last-mentioned rock-arm, a cam adapted to bear against one side of said pin and to move said rock-arm only in a direction to unclamp said pinion-nut, and a latch adapted to engage said rack when in unclamped position.

8. In a turret lathe, the combination of a turret, a support therefor, a shaft mounted upon and moving with the support, said shaft extending parallel to the ways on which the support moves, whereby the shaft may be driven from the counter shaft of the lathe, notwithstanding its movements with the turret support, and means for moving the turret support toward and from the work, independent of said shaft, and gearing between the same and the turret.

9. In a turret lathe, the combination of a turret, a support therefor, means for reciprocating said support toward and from the work, and means for rotating the turret, said last-mentioned means comprising a uniformly driven shaft on said support, gearing for rotating said turret, a clutch for connecting said gearing to said shaft, means for engaging said clutch, said means comprising a part movable transversely to the line of movement of said support, and a projection secured to a relatively movable part of the lathe in the path of movement of said last-mentioned part.

10. In a turret lathe, the combination of a turret, a support therefor, means for reciprocating said support toward and from the work, means for rotating the turret, said last-mentioned means comprising a uniformly driven shaft on said support, gearing for rotating said turret, a clutch for connecting said gearing to said shaft, means for engaging said clutch, said means comprising a part movable transversely to the line of movement of said support, a projection secured to a relatively immovable part of the lathe in the path of movement of said last-mentioned part, and means for maintaining the members of said clutch in engagement during a movement of the turret from one station to another.

11. In a turret lathe, the combination of a turret, a support therefor, means for reciprocating said support toward and from the work, means for rotating the turret, said last-mentioned means comprising a uniformly driven shaft on said support, gearing for rotating said turret, a clutch for connecting said gearing to said shaft, means for engaging said clutch, said means comprising a part movable transversely to the line of movement of said support, a projection secured to a relatively immovable part of the lathe in the path of movement of said last-mentioned part, and means for maintaining the members of said clutch in engagement during a complete revolution, and for releasing said clutch at the end of such revolution.

12. In a turret lathe, the combination of a turret, a turret slide, means for reciprocating said slide, a uniformly-rotating shaft on said slide, gearing for rotating said turret, a clutch for connecting said gearing to said shaft, a shipper lever for operating said clutch, said lever being mounted upon a shaft journaled on said slide and extending transversely to the line of movement thereof, a path-cam driven by the aforesaid gearing, said path-cam having a circular portion, a spiral portion connected thereto, and an oblique portion connecting the ends of said circular and spiral portions, said shipper lever having a pin adapted to be engaged by said cam, said lever-shaft having a shoulder whereby it may be turned, a rod mounted on said turret-slide and adapted to engage said shoulder, and a projection mounted on the lathe bed and adapted to raise said rod as the latter rides over said projection.

13. In a turret lathe, the combination of a turret, a turret slide, means for reciprocating said slide, a uniformly-rotating shaft on said slide, gearing for rotating said turret, a clutch for connecting said gearing to said shaft, a shipper lever for operating said clutch, said lever being mounted upon a shaft journaled on said slide and extending transversely to the line of movement thereof, a path-cam driven by the aforesaid gearing, said path cam having a circular portion, a spiral portion connected thereto, and an oblique portion connecting the ends of said circular and spiral portions, said shipper lever having a pin adapted to be engaged by said cam, said lever-shaft having a shoulder whereby it may be turned, a rod mounted on said turret-slide and adapted to engage said shoulder, and a projection mounted on the lathe bed and adapted to raise said rod as the latter rides over said projection, said projection being pivoted at its rear end and having an inclined shoulder, whereby said rod may turn said projection out of the way upon the forward stroke of the turret slide.

14. In a turret lathe, the combination of a turret, a reciprocating turret slide, a constantly driven shaft, gearing between the shaft and the turret for rotating the turret, a clutch for connecting and disconnecting the gearing and shaft, a lever for actuating the clutch, a cam-block mounted stationarily relative to the turret slide, and a part on the latter for actuating the lever, in whose path the cam-block is situated, said cam-block being removable and interchangeable with another.

In testimony that we claim the foregoing we have hereunto set our hands.

JAMES C. POTTER.
JOHN JOHNSTON.

Witnesses:
EARL H. ROBERTS,
CHAS. W. ROBERTS.